United States Patent [19]

Hayward et al.

[11] Patent Number: 4,913,970
[45] Date of Patent: Apr. 3, 1990

[54] ADHESION PROMOTING COMPOSITION AND COATED FILM

[75] Inventors: Jack Hayward, Hilton; Michael W. Orem; Gerald G. Reafler, both of Rochester, all of N.Y.

[73] Assignee: Eastman Kodak Company, Rochester, N.Y.

[21] Appl. No.: 237,129

[22] Filed: Aug. 29, 1988

Related U.S. Application Data

[63] Continuation-in-part of Ser. No. 116,426, Nov. 3, 1987.

[51] Int. Cl.$^4$ ............... B32B 27/18; B29C 55/00; C08G 18/06
[52] U.S. Cl. ................... 428/423.7; 156/229; 264/291; 428/421; 428/423.3; 428/425.9; 428/328; 528/76; 528/905
[58] Field of Search ............ 428/421, 422, 423.3, 428/423.7, 425.9; 560/157; 156/229; 264/291; 528/76, 905

[56] References Cited

U.S. PATENT DOCUMENTS

| | | | |
|---|---|---|---|
| 4,147,679 | 4/1979 | Scriven et al. | 260/29.2 |
| 4,267,265 | 5/1981 | Sugimoto et al. | 430/523 |
| 4,369,221 | 1/1983 | Bennett | 428/423.7 |
| 4,719,132 | 1/1988 | Porter, Jr. | 428/423.1 |

FOREIGN PATENT DOCUMENTS

1259398 of 0000 United Kingdom.
1352560 of 0000 United Kingdom.

OTHER PUBLICATIONS

3M–The Leader in Electrofluorination, Commercial Chemicals Division/3M.
McCutcheon's Emulsifiers & Detergents, North American Edition (1983).

Primary Examiner—George F. Lesmes
Assistant Examiner—Christopher Brown
Attorney, Agent, or Firm—William J. Davis

[57] ABSTRACT

A tie-coat composition for preparing paint-coated, stretchable polyester which can be bonded to automobile panels. The tie-coat contains a non-ionic, fluorinated surfactant which reduces product non-uniformities.

14 Claims, No Drawings

ADHESION PROMOTING COMPOSITION AND COATED FILM

RELATED APPLICATIONS

This application is a continuation-in-part of the application of Gerald G. Reafler, Ser. No. 116,426 filed Nov. 3, 1987.

FIELD OF THE INVENTION

This invention relates to an adhesion promoting composition and to a paint-coated film and, more particularly, to a composition for improving the adhesion of a paint layer to a stretchable, thermoplastic carrier film.

BACKGROUND

A new development in applying protective, decorative coatings or paints to surfaces such as automobile panels, household appliances and the like involves coating a water based polyurethane paint on a stretchable carrier film which is stretched over and bonded to the surface to be covered. Such paint-coated sheets afford savings in paints as compared with conventional spray painting processes. Moreover, air pollution from evaporating paint solvents can be reduced.

In order to improve the adhesion of paint layers to the stretchable carrier film, compositions have been developed to serve as adhesion promoting layers or tie coats. While some of these improve adhesion, they create other problems such as curling of the carrier film, yellowing of layers of the finished article, and/or defects in the ultimate paint coating, which are caused by craters or pinholes in the tie coat (also referred to as "repellencies" in the photographic industry.) Further improvement in tie coat compositions for adhering aqueous polyurethane paints to carrier films has, therefore, been desirable.

SUMMARY OF THE INVENTION

The present invention provides a new composition for coating the carrier film before the paint is applied. This coating composition provides good adhesion between the paint layer and the carrier film while eliminating or reducing such problems as curl, discoloration and coating non-uniformities such as craters and pinholes.

The coating composition of the invention comprises an aqueous polymeric dispersion comprising a urethane resin derived from a multifunctional isocyanate and a polyol. As an improvement the composition contains a non-ionic fluorinated surfactant of the formula:

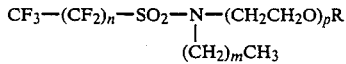

wherein R=H or lower alkyl,
m=1−4,
n=5−9,
p=2−30,
which reduces the tendency of the coating composition to form craters an pinholes at low coating coverages.

The invention also includes a paint-coated film comprising a stretchable, thermoplastic polyester carrier film having thereon a thin, dried tie coat containing the above-indicated non-ionic, fluorinated surfactant and, over the tie coat, an aqueous polyurethane paint layer.

DETAILED DESCRIPTION

The compositions of the invention are used in the manufacture of the flexible and stretchable sheet material of the Reafler patent application Ser. No. 116,426 of November 3, 1987. This sheet material is a paint-coated film which is applied by thermoforming or molding to the surfaces of automobile panels or other articles to serve as a protective and decorative covering.

The sheet material includes a flexible and stretchable carrier film and polymeric coatings such as paint layers and clear topcoats, which have heat softening and tensile elongation properties that are compatible with those of the carrier film so that the sheet material can be stretched without crazing or delaminating the coated layers.

The carrier films for which the tie coat compositions of the present invention are especially useful are formed by melt extruding thermoplastic immiscible blends of a relatively rigid, linear polyester and a more flexible copolymer.

A preferred linear polyester for such blends is a copolkymer fo terephthalic acid, 1,4-cyclohexanedimethanol and a lower alkylene glycol. The more flexible copolyme can be a polymer such as a rubber-modified, styrene-maleic anhydride copolymer or a poly(etherester) derived from 1,4-cyclohexanedicarboxylic acid.

A preferred carrier film composition is an immiscible blend of a copolyester based on poly(1,4-cyclohexylenedimethylene therephthalate) and a more flexible rubber-modified styrene-maleic anhydride copolymer, as described in the patent to Weemes et al. U.S. Pat. No. 4,582,876 dated Apr. 15, 1986. More particularly the blend contains (a) 70 to 30 weight percent copolyester consisting of repeating units from terephthalic acid, repeating units from 1,4-dyclohexanedimethanol present in the amount of 25 to 90 mole % and repeating units from a second glycol having 2 to 6 carbon atoms present in the amount of 75 to 10 mol %, wherein the total mol % of glycol is equal to 100 mol %, and (b) 30 to 70 weight percent thermoplastic rubber-modified vinyl aromatic polymer composition comprising (1) from 60 to 93% by weight of a nonequimolar copolymer of 70 to 98% by weight based on a copolymer of a vinyl aromatic monomer and from 2 to 30% by weight based on a copolymer of an unsaturated dicarboxylic acid moiety copolymerizable therewith, and (2) from 7 to 40% by weight of at least two differing rubbery additives which were present during the copolymerization of the monomers of component (1), wherein the rubbery additives comprise from 5 to 20% by weight based on the total composition of at least one high vinyl aromatic conjugated diene copolymer wherein the at least one high conjugated diene-vinyl aromatic copolymer comprises from about 60 to about 98% by weight of the conjugated diene. At least one high vinyl aromatic conjugated diene copolymer preferably is a block copolyme which comprises a greater amount of vinyl aromatic than conjugated diene monomer. The composition can include fillers, UV absorbers, plasticizers, colorants, antioxidants, etc. known to be useful in polymeric films.

Another preferred composition for carrier films is described in the copending application of Seymour, Ser. No. 151,727 filed February 3, 1988. This composition forms a very flexible carrier film which is especially useful for applying coverings to plastic articles by the "in-sold" process. The composition is an immiscible blend of a fleixble poly(etherester) with a more rigid linear polyester of terephthalic acid. More specifically, the blends comprise (A) about 98-2 weight % of a flexible poly(etherester) having an I.V. of about 0.8-1.5 and recurring units from
  (1) a dicarboxylic acid component consisting essentially of 1,4-cyclohexanedicarboxylic acid having a transisomer content of at elast 70%,
  (2) a glycol component consisting essentially of
    (a) about 95 to about 65 mol % 1,4-cyclohexanedimethanol, and
    (b) about 5 to about 35 mol % poly(oxytetramethylene) glycol having a molecular weight of about 500 to about 1100, and
(B) about 2-98 weight % of a relatively rigid polyester having recurring units from about 80-100 mol % terephthalic acid and at least one aliphatic or cycloaliphatic glycol having 2-12 carbon atoms, said polyester having an I.V. of about 0.5-1.0, The blends have greater stiffness than the poly(etherester) alone. They also have unexpectedly improved notched Izod impact strengths when compared to the poly(etherseter) alone when the blends contain about 98-60 wt % of the flexible poly(esterether) and about 2-40 wt % of the relatively rigid polyester.

The dibasic acid component of the poly(etherester) consists essentially of 1,4-cyclohexanedicarboxylic acid having a trans isomer content of at least 70%, preferably at least 80% and most preferably at least 85% trans isomer content.

The poly(oxytetramethylene) glycol component has a moleuclar weight of between about 500 and about 1100, preferably about 1000 (weight average). It is used in an amount of from about 5 to about 25 mol %, preferably about 8-15%, based on the total glycol mol %.

The poly(etherester) further may comprise up to about 1.5 mol %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellititc acid or anhydride, trimesic acid, trimethylol ethane and trimethylol propane.

It should be understood that in this polymer the total acid reactants should be 100 mol %, and the total glycol reactants should be 100 mol %. Although the acid reactant is said to "consist essentially of" 1,4-cyclohexanedicarboxylic acid, if the branching agent is a polybasic acid or anhydride, it will be calculated as part of the 100 mol % acid. Likewise, the glycol reactant is said to "consist essentially of" 1,4-cyclohexanedimethanol and poly(oxytetramethylene) glycol, if the branching agent is a polyol, it will be calculated as part of the 100 mol % glycol.

The poly(etherester) compositions preferably contain a hindered, non-volatile phenolic antioxidant in a amount of from about 0.1 to about 1.0, based on the weight of copolyesterether.

The trans and cis isomer contents of the final poly(etherester) are controlled in order to give polymers that setup or crystallize rapidly. The poly(etherester) can be prepared by conventional techniques using an acid component, consisting essentially of terephthalic acid. Minor amounts of other conventionally used dicarboxylic acids (up to about 10%) such as isophthalic, naphthalene dicarboxylic or aliphatic dicarboxylic acids having about 4 to 12 carbon atoms may be used. A glycol, or a combination of glycols for copolymers, having 2 to 12 carbon atoms is used. The preferred glycols are ethylene glycol, 1,4-butanediol and 1,4-cyclohexanedimethanol, and combinations thereof. Especially preferred glycols are ethylene glycol and 1,4-cyclohexanedimethanol and combinations thereof. The I.V. of the polyester is about 0.5-1.0.

The flexible poly(etherester) and the more rigid polyester can be blended by conventional plastic melt-mixing methods such as melt blending using an extruder.

The following are examples of components of highly flexible polymer blends which are useful in forming carrier films. Polymer "X" is a poly(etherester) having an I.V. of 1.23 and recurring units from
  99.5 mol % 1,4-cyclohexanedicarboxylic acid (trans content about 90%)
  0.5 mol % trimellitic anhydride
  91.1 mol % 1,4-cyclohexanedimethanol
  8.9 mol % poly(oxytetramethylene) glycol having a molecular weight of 1000

Polymer "Y" is an amorphous, linear polyester having an I.V. of 0.75 and recurring units from
  100 mol % terephthalic acid
  68 mol % 1,4-cyclohexanedimethanol
  32 mol % ethylene glycol Polymer "Z" is an amorphous, linear polyester having an I.V. of 0.75 and recurring units from
  100 mol % terephthalic acid
  69 mol % ethylene glycol
  31 mol % 1,4-cyclohexanedimethanol In forming specific carrier film blends, polymer X can be melt blended with polymer Y or polymer Z in various ratios to provide a carrier film blend having the desired physical properties.

The tie coat compositions of the invention are especially effective in improving the coating of certain kinds of paint compositions on carrier films of the types discussed above. The paint compositions are water-based polyurethane paints which are designed as automotive finishes and which have heat softening and tensile elongation properties that are compatible with those of the stretchable carrier film.

Aqueous polyurethane paint compositions having the desired properties contain polyurethanes which can be prepared by reacting an organic polyisocyanate with an active hydrogen-containing compound such as a polyol or a polyamine or a mixture thereof to form a polyurethane, a polyurea or a mixed poly(urethane-urea). The term polyurethane is used broadly herein to mean any of such polymers.

The organic polyisocyanate can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexylisocyanate). Examples of suitable higher polyisocyanates are 1,2,4-benzene triisocyanates and polymethylene polyphenyl isocyanate.

Water-based polyurethane basecoats in color-plus-clear compositions are disclosed in U.S. Pat. No. 4,719,132. The polyurethane basecoat compositions described in the patent can be used in the practice of the present invention. Other examples of useful water-based polyurethanes are disclosed in U.S. Pat. No. 4,149,679 as well as in the parent Reafler patent application. These disclosures are incorporated herein by reference.

The aqueous polyurethane paint compositions can contain various additives, especially colorants. These include inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocycanine green, carbozole violet, anthrapyrimidine yellow, flavanthrone yellow, isoindoline yellow, indanthrone blue, quinacridone violet, perylene reds, diazo red and others known to those skilled in the art.

The paints can also contain reflective particles in addition to a colorant and binder. Any particles conventionally employed in paints, particularly those employed in automotive finish paints can be used. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of particles can be used. It is belived that paints containing a substantial concentration of such pigments and reflextive particles present problems in coating on polyester carrier films. The tie coats of the present invention contribute to the successful coating of such paint compositions.

The paint layer preferably has a mean thickness Tr in the range of from about 0.012 to 0.080 millimeters. A particularly preferred mean thickness is in the range of from about 0.020 to 0.060 millimters. The maximum thickness deviation tr of the the paint layer preferably satisfies the relation tr<0.15 Tr. More preferably, tr satisfies the relation tr<0.10 Tr. Thickness and thickness deviation of the paint layer can be readily determined from cross-sectional photomicrographs of the sheet material.

Examples of useful aqueous polyurethane paint compositions are listed in Tables I, II and III.

TABLE I

| Ingredient | Approximate % Weight |
|---|---|
| Deionized Water | 50 |
| Urethane Resin | 25 |
| Aluminum Paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

TABLE II

| Ingredient | Approximate % Weight |
|---|---|
| Deionized water | 55 |
| Urethane resin | 20 |
| Ethylene Glycol Monohexyl Ether | 5 |
| N-Methylpyrrolidone | 5 |
| Diethylene Glycol Monobutyl Ether | 1 |
| N,N-Dimethyl ethanolamine | 1 |
| Titanium Dioxide/Mica | <1 |
| Silica | <1 |
| Carbon Black | <1 |
| Isopropyl Alcohol | <1 |

TABLE III

| Ingredient | Approximate % Weight |
|---|---|
| Titanium Dioxide | 25 |
| Ethylene Glycol Monohexyl ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

The novel tie coat composition which is coated on carrier films of the types described above includes components of known compositions but, in addition, contains a surfactant which is superior to others in improving the coating uniformity and performance of the tie coat. The surfactant which provides the unexpected improvement is a non-ionic fluorinated surfactant of the formula:

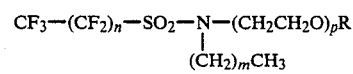

wherein R = H or lower alkyl,
m = 1−4,
n = 5−9,
p = 2−30,

Preferred surfactants of this class are those in which n = 7, m = 1, and R = H, methyl, ethyl or n-propyl. Especially preferred are the compositions known as Fluorad R FC170C and FC 171 Surfactants sold by 3M Company.

The liquid tie coat and paint compositions are coated successively on the carrier film, each being dried before any subsequent coating is applied. The coating procedure employed is a laminar flow procedure. This includes direct extrusion onto the carrier film by use of an extrusion hopper functioning to apply the coating composition by bead coating or a stretch-flow coating mechanism. Another kind of laminar flow coating process involves extrusion of the coating composition through a slot with subsequent travel down the slide surface of a slide hopper or subsequent free fall in a curtain coating process. Also included are curtain coating processes in which the curtain is generated by the use of an overflow weir, and so forth. The critical aspect of the coating process is its ability to provide a defect-free coating with a high degree of uniformity of layer thickness. In view of the flexible nature of the support, it can be coated using conventional web transport systems and will, for reasons of economy, typically be coated at web widths of up to two meters or more and web speeds ranging from several meters to several hundred meters per minute.

Extrusion hoppers are particularly effective devices for coating the tie coat compositions of this invention. Likewise the novel tie coat compositions are valuable in making it possible to coat thin tie coats with such high precision equipment. Such coating devices are also well-adapted for use with compositions which exhibit the shear-thinning characteristics typical of the paint compositions hereinbefore described. In such hoppers, transverse pressure gradients are minimized and almost all pressure drop across the slot is in the direction of coating.

Preferred coating techniques and apparatus useful in the practice of the present invention are used in the manufacture of photographic products and are described in U.S. Pat. Nos. 2,253,060, 2,289,798, 2,681,294, 2,815,307, 2,989,882, 2,901,770, 3,632,374, and 4,051,278.

After being coated onto the support, the coated layers are converted to a dry and tack-free state by drying, for example by conventional techniques or by the method of the application of Fronheiser et al Ser. No. 166,083 filed March 9, 1988, at temperatures of 25-100 degrees C.

The non-ionic fluroinated surfactant can be employed with a range of aqueous polyurethane tie coat compositions. The tie coat layer preferably has a dry thickness not greater than about 0.0025 mm and most preferably not greater than 0.001 mm. The thickness preferably is much less than the thickness of the paint layer. For example, the paint layer preferably has a thickness at least 8 times the thickness of the adhesion promoting layer.

The fact that the tie coat is so thin creates one of the problems which the present invention solves. Such thin tie coats, when coated by laminar flow, are susceptible to non-uniformites such as craters and pinholes. These are spots or areas on the film surface which are significantly reduced in thickness or completely void. They are usually circular in shape. The compositions of the invention markedly reduce the number of such craters and pinholes even when very thin coats are applied by laminar flow coating.

The tie coat compositions of the invention include as one component an aqueous polyurethane composition which, when dired as a thin layer on the carrier film, improves the adhesion of an aqueous polyurethane paint or basecoat to a stretchable carrier film formed from an immiscible blend of a linear amorphous polyester and a more flexible copolymer such as an acrylic copolymer or a copolyester. The other component of the new composition is the non-ionic fluorinated surfactant which has been described.

A preferred example of such an aqueous polyurethane tie coat composition comprises a dispersion in water of (a) a polyurethane derived from methylene dicyclohexyl diisocyanate and an aliphatic or cycloaliphatic diol and (b) a styrene-butyl acrylate-butyl methacrylate terpolymer. The dispersion also includes minor amounts of addenda such as N-methylpyrrolidone, diethylene glycol monobutyl ether, ethylene glycol monohexyl ether and N,N-dimethyl ethanolamine. The polymer components and addenda are dispersed in water to yield a dispersion which contains from about 60 to 95 weight percent water, preferably 70 to 90 weight percent water. A composition of the invention is then formed by adding from about 0.001 to 0.50 weight percent of the non-ionic surfactant, preferably 0.01 to 0.30 weight percent. The solids content of the dispersion is in the range from about 5 to about 40 weight percent.

The examples which follow provide further understanding of the invention. The control examples describe unsuccessful attempts to adhere aqueous polyurethane paints to carrier films while the invention examples illustrate preferred embodiments of the invention.

Control Example "A"

A stretchable carrier film of the blend of a linear polyester and a rubbery copolymer as described in the patent to Weemes et al, U.S. Pat. No. 4,582,866 was coated by means of an extrusion hopper of the type disclosed in the patent to Beguin, U.S. Pat. No. 2,681,294 with a thin layer of an aqueous tie coat composition as described in Table IV at a dry coverage of 0.54 g/sq m. After drying, the thickness of the tie layer was approximately 0.0005 mm. Over the dried layer was then coated at a dry coverage of 43 g/sq m an aqueous polyurethane paint layer of the metallic paint composition listed in Table I. The paint layer was dried toa thickness of about 0.038 mm. The reulting coated film had numberous craters in the form of circular patterns as large as several millimeters in diameter

TABLE IV

| Tie coat composition | |
|---|---|
| Ingredients | Approx. % Wt. |
| Ethylene Glycol Monohexyl Ether | <1 |
| Deionized Water | 75 |
| N,N-Dimethyl Ethanolamine | <1 |
| N-Methylpyrrolidone | 1 |
| Diethylene Glycol Monobutyl Ether | 1 |
| Acrylic Resin | 10 |
| Urethane Resin | 10 |
| diluted with water to a total solids content of 8.6% by weight. | |

*Styrene-butyl acrylate-butyl methacrylate terpolymer
**Reaction product of methylene dicyclohexyl diisocyanate and an aliphatic diol Control Example "B"

The steps of Example A were repeated but substituting as the tie coat a solution containing 1.5 weight percent of an organic acrylonitrile/vinylidene chloride/acrylic acid terpolymer (12/68/20 weight ratio) and 98.5 weight percent methyl ethyl ketone and as the paint layer the white paint composition listed in Table III. Upon storage at ambient conditions for several days, the paint layer of the coated film developed a pronounced yellow color. The film also curled badly.

Control Example "C"

The steps of Example A were repeated in a series of tests but with the addition of solutions of the following surfactant compounds in various concentrations to the tie coat composition:

Surfactant (a) AEROSOL OT, an anionic hydrocarbon sulfonate surfactant marketed by American Cyanamid Co.

(b) HOSTAPUR SAS, an anionic hydrocarbon sulfonate surfactant marketed by American Hoechst Corp.

(c) SANDOXYLATE SX-418, a nonionic hydrocarbon polyalkyleneoxide adduct marketd by Sandoz Colors and Chemicals.

(d) ZONYL FSO, a nonionic fluoroalkyl polyethyleneoxide adduct marketed by DuPont Co.

(e) SURFACTANT 10G, a nonionic hydrocarbon polyalkyleneoxide adduct marketed by Olin Corporation.

(f) TRITON X-102, a nonionic hydrocarbon polyethyleneoxide adduct marketed by Rohm and Haas Company.

The results observed for each composition were as follows:

| Surfactant | Results |
|---|---|
| a | particles |
| b | run back of coating composition hopper vortex. |
| c | narrow coating, particles, |
| d | streaky coating |

| Surfactant | Results |
|---|---|
| e | craters |
| f | narrow coating |

In the lising of results the term "particles" means that a number of particles or small slugs appeared in the tie coat. "Run back" means that the liquid compositions failed to form a cohesive bead at the interface between the hopper and the web and liquid ran down the arriving web surface. "Narrow coating" means that the tie coat layer drew inwardly at the edges. The other terms are self-explanatory.

Invention Example 1

The steps of Example A were repeated except that to the tie coat dispersion were added, before coating them, the following nonionic fluoroalkyl polyethylene oxide adducts marketed under the indicated tradename by 3M Company:
(a) FLUROAD FC 170 C
(B) FLUORAD FC 171

These compositions when coated by laminar flow as in the control examples formed tie coats that were free of problems. When overcoated with a white aqueous polyurethane paint layer of the composition listed in Table III, each layer being dried after coating, results were excellent. The paint layer adhered well to the carrier film, it displayed no craters or pinholes from the tie coat, the film did not curl and none of the layers discolored.

Control Example D

The steps of Example A were repeated but substituting as the paint layer the composition listed in Table III, and as the tie coat an aqueous polymeric dispersion comprising a uretahen resin derived from a multifunctional isocyanate and a polyol marketed under the tradenamce WITCOBOND W-240 by the Witco Corporation, Chicago, Illinois. The surface of the carrier film had been treated by corona discharge by a conventional method prior to the application of the tie coat.

The resulting film showed irregular patterns or defects caused by coating inconsistencies.

Invention Example 2

The steps in Example D were repeated except that to the tie coat dispersion was added, before coating it, the surfactant FLUORAD FC 170C.

Good results similar to those described in Example 1 were obtained.

Invention Example 3

Results similar to those described in Examples 1 and 2 were obtained with coatings of the compositions described in Example 2 wherein as the tie coat the following dispersions comprising a urethane resin derived from a multi-functional isocyanate and a polyol were substituted:
(a) WITCOBOND W-260, marketed by the Witco Corporation, Chicago, Illinois;
(b) SANCURE 872, marketed by Sanncor Industries, Inc., Leominster, MA;
(c) NEOREZ R963, marketed by ICI, Wilmingont, Delaware.

The invention has been described in detail with particular reference to preferred embodiments thereof, but it will be understood that variations and modifications can be effected within the spirit and scope of the invention.

We claim:

1. In a coating composition comprising an aqueous polymeric dispersion comprising a uretahne resin derived from a multifunctional isocyanate and a polyol, the improvement wherein said composition also contains a non-ionic fluorinated surfactant of the formula:

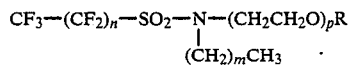

wherein $R = H$ or lower alkyl,
$m = 1-4$,
$n = 5-9$,
$p = 2-30$,
whereby the tendency of said coating composition to form repellencies on polyester films at low coating coverages is reduced.

2. The coating composition of claim 1 further containing a copolymer of styrene, butyl acrylate and butyl methacrylate.

3. The coating composition of claim 2 further containing N-methylpyrrolidone.

4. The coating composition of claim 1 further containing diethylene glycol monobutyl ether.

5. The coating composition of claim 4 wherein the concentration of said surfactant in the solution is from about 0.01 to 0.1 weight percent.

6. The coating composition of claim 1 wherein $R = H$, methyl, ethyl or n-propyl, $m = 1$ and $n = 7$.

7. A coated film comprising a stretchable carrier film formed of an immiscible blend of a polyester with another polymer having on its surface a thin, dried tie coat layer comprising a urethane resin and a non-ionic fluorinated surfactant of the formula:

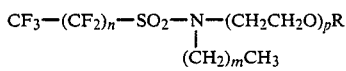

wherein $R = H$ or lower alkyl,
$m = 1-4$,
$n = 5-9$,
$p = 2-30$,
and a polyurethane paint layer, whereby said tie layer improves the adhesion of the paint layer to the carrier film.

8. A film according to claim 7 wherein $R = H$, methyl, ethyl or n-propyl, $m = 1$ and $n = 7$.

9. A film according to claim 7 wherien the carrier film is formed of a blend of linear polyester and a more flexible copolymer.

10. A film according to claim 9 wherein the carrier film is formed of an immiscible blend of a linear polyester with a rubber-modified styrene-maleic anhydride copolymer.

11. A film according to claim 7 wherien the paint layer is formed of an aqueous polyurethane composition.

12. A film according to claim 11 wherein the aqueous polyurethane composition also contains a styrene-acrylic copolymer and metal flake.

13. A film according to claim 7 wherien the dried tie coat layer has a thickness not greater than about 0.0025 mm.

14. A film according to claim 13 wherein the dried tie coat layer has a thickness not greater than about 0.001 mm.

* * * * *